US012586733B2

(12) United States Patent
Hogiri et al.

(10) Patent No.: US 12,586,733 B2
(45) Date of Patent: Mar. 24, 2026

(54) COMPOSITE POWDER FOR MANUFACTURING POROUS BODY INCLUDED IN ANODE BODY OF ELECTROLYTIC CAPACITOR, METHOD OF MANUFACTURING COMPOSITE POWDER, AND METHOD OF MANUFACTURING ANODE BODY FOR ELECTROLYTIC CAPACITOR

(71) Applicant: Panasonic Intellectual Property Management Co., Ltd., Osaka (JP)

(72) Inventors: Masayuki Hogiri, Osaka (JP); Yukiyasu Sugihara, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 162 days.

(21) Appl. No.: 18/743,506

(22) Filed: Jun. 14, 2024

(65) Prior Publication Data

US 2025/0014837 A1     Jan. 9, 2025

(30) Foreign Application Priority Data

Jul. 6, 2023     (JP) ................................. 2023-111406

(51) Int. Cl.
| | |
|---|---|
| *H01G 9/052* | (2006.01) |
| *C22C 1/04* | (2023.01) |
| *H01G 9/028* | (2006.01) |
| *H01G 9/15* | (2006.01) |

(52) U.S. Cl.
CPC ........... *H01G 9/0525* (2013.01); *C22C 1/045* (2013.01); *H01G 9/028* (2013.01); *H01G 9/15* (2013.01)

(58) Field of Classification Search
CPC ........ H01G 9/052; H01G 9/15; H01G 9/0525; B22F 1/102
See application file for complete search history.

(56) References Cited

U.S. PATENT DOCUMENTS

| | | | | | |
|---|---|---|---|---|---|
| 3,647,495 | A | * | 3/1972 | Cline ................... | C09C 1/3692 |
| | | | | | 106/447 |
| 2008/0239631 | A1 | * | 10/2008 | Fujita ...................... | H01G 9/15 |
| | | | | | 29/25.42 |

FOREIGN PATENT DOCUMENTS

| | | |
|---|---|---|
| JP | 2003-509583 | 3/2003 |
| JP | 2020-500260 | 1/2020 |
| JP | 2022-533161 | 7/2022 |
| WO | 2001/019555 | 3/2001 |
| WO | 2018/075419 | 4/2018 |
| WO | 2020/236573 | 11/2020 |

* cited by examiner

*Primary Examiner* — David M Sinclair
(74) *Attorney, Agent, or Firm* — Rimon P.C.

(57) ABSTRACT

A composite powder for manufacturing a porous body included in an anode body of an electrolytic capacitor contains a raw material powder containing a valve metal and an alcohol compound (excluding a polymer) adhering to surfaces of particles of the raw material powder. A melting point of the alcohol compound is more than or equal to 35° C.

26 Claims, 4 Drawing Sheets

COMPOSITE POWDER FOR MANUFACTURING POROUS BODY INCLUDED IN ANODE BODY OF ELECTROLYTIC CAPACITOR, METHOD OF MANUFACTURING COMPOSITE POWDER, AND METHOD OF MANUFACTURING ANODE BODY FOR ELECTROLYTIC CAPACITOR

BACKGROUND

1. Technical Field

The present disclosure relates to a composite powder for manufacturing a porous body included in an anode body of an electrolytic capacitor, a method of manufacturing the composite powder, and a method of manufacturing an anode body for an electrolytic capacitor.

2. Description of the Related Art

In recent years, an electrolytic capacitor that has a small equivalent series resistance (ESR) and excellent frequency characteristics has been developed. An anode body of the electrolytic capacitor includes, for example, a porous body containing a valve metal, and a dielectric layer covering the porous body. As a raw material of the porous body, for example, a raw material powder which contains the valve metal and to which an additive (binder) is added is used.

Unexamined Japanese Patent Publication No. 2022-533161 proposes "a solid electrolytic capacitor including a capacitor element that includes: a sintered porous anode body; a dielectric that overlies the anode body; and a solid electrolyte that overlies the dielectric and includes a conductive polymer and a depolarizer". In addition, in Unexamined Japanese Patent Publication No. 2022-533161, a powder containing tantalum or the like is exemplified as a powder for forming the sintered porous anode body. An acrylic polymer or the like is exemplified as a binder for use in aggregation of particles of the powder.

Unexamined Japanese Patent Publication No. 2020-500260 proposes "a tantalum powder including tantalum, hydrogen doped in the tantalum, and nitrogen doped in the tantalum, wherein a value (H/BET) of a hydrogen (H) content (ppm) of the tantalum powder divided by Brunauer-Emmett-Teller (BET) surface area ($m^2/g$) of the tantalum powder is greater than 100, wherein the tantalum powder has (a) a hydrogen content of from 300 ppm to 1200 ppm, (b) a nitrogen content of from 500 ppm to 3,500 ppm, and (c) a BET range of from 3 $m^2/g$ to about 10 $m^2/g$". In addition, in Unexamined Japanese Patent Publication No. 2020-500260, camphor or the like is exemplified as a binder that is added to the tantalum powder.

Unexamined Japanese Patent Publication No. 2003-509583 proposes "a method of producing an anode for an electrolytic capacitor, the method including the steps of: combining a metal powder and dimethyl sulfone in an amount to be effective as a binder; pressing the powder and the dimethyl sulfone to form an anode body; and removing the dimethyl sulfone".

SUMMARY

One aspect of the present disclosure relates to a composite powder for manufacturing a porous body included in an anode body of an electrolytic capacitor. The composite powder contains a raw material powder containing a valve metal and an alcohol compound (excluding a polymer) adhering to surfaces of particles of the raw material powder, and a melting point of the alcohol compound is more than or equal to 35° C.

Another aspect of the present disclosure relates to a method of manufacturing a composite powder for manufacturing a porous body included in an anode body of an electrolytic capacitor. The manufacturing method includes: a step of preparing a raw material powder containing a valve metal; a step of preparing an alcohol solution containing a solvent and an alcohol compound (excluding a polymer) having a melting point of more than or equal to 35° C.; a step of adding the alcohol solution to the raw material powder while stirring the raw material powder to obtain the raw material powder in a wet state; and a step of removing the solvent by drying the raw material powder in the wet state while stirring the raw material powder to obtain a composite powder.

Still another aspect of the present disclosure relates to a method of manufacturing an anode body for an electrolytic capacitor. The manufacturing method includes: a step of preparing a composite powder that contains a raw material powder containing a valve metal and an alcohol compound (excluding a polymer) adhering to a surface of a particle of the raw material powder; a step of performing compression-molding after filling a predetermined mold with the composite powder to obtain a compact; a step of removing the alcohol compound included in the compact; a step of sintering the compact from which the alcohol compound has been removed to obtain a porous body; and a step of forming a dielectric layer on a surface of the porous body to obtain an anode body. A melting point of the alcohol compound is more than or equal to 35° C.

According to the present disclosure, it is possible to reduce a content of carbon derived from the additive added to the raw material powder containing the valve metal in a process of producing the porous body, and reducing variation in mass regarding the porous body included in the anode body of the electrolytic capacitor.

DETAILED DESCRIPTIONS OF EMBODIMENT

Figure 1:
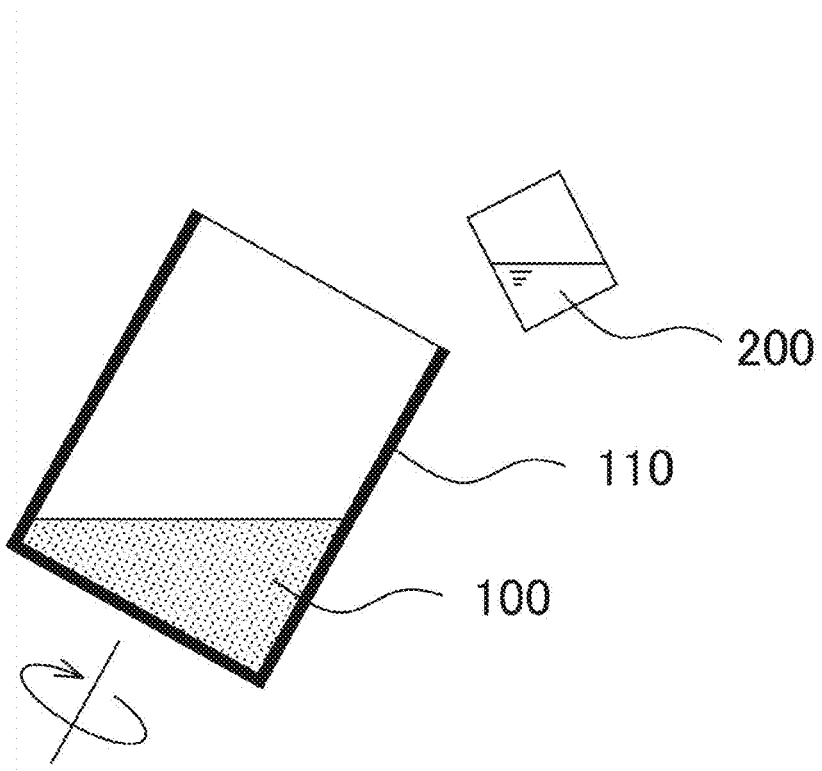
FIG. 1 is a view illustrating an example of wet mixing of a raw material powder and alcohol compound A.

Prior to the description of exemplary embodiments of the present disclosure, problems to be solved by the present disclosure are briefly described.

Regarding a porous body included in an anode body of an electrolytic capacitor, there is a demand for reducing a content of carbon derived from an additive added to a raw material powder containing a valve metal in a process of producing the porous body, and reducing variation in mass.

Hereinafter, the exemplary embodiments of the present disclosure will be described with reference to examples, but the present disclosure is not limited to examples to be described below. Although specific numerical values and materials are sometimes provided as examples in the following description, other numerical values and materials may be used as long as the effect of the present disclosure can be achieved. In this specification, the description "from numerical value A to numerical value B" includes a numerical value A and a numerical value B, and can be read as "between numerical value A and numerical value B (inclusive)". In the following description, in a case where lower limits and upper limits related to numerical values of specific physical properties, conditions, or the like are illustrated, any of the illustrated lower limits and any of the illustrated upper limits can be freely combined unless the lower limit is equal to or more than the upper limit. In a case where a plurality of materials is illustrated, one of the materials may be selected and used alone, or two or more of the materials may be used in combination.

The anode body of the electrolytic capacitor includes a porous body (porous sintered body) containing a valve metal, and a dielectric layer covering a surface of the porous body. The present disclosure relates to a composite powder for manufacturing the porous body included in the anode body of the electrolytic capacitor. The composite powder according to an exemplary embodiment of the present disclosure contains a raw material powder containing a valve metal and an alcohol compound (excluding a polymer) adhering to surfaces of particles of the raw material powder. A melting point of the alcohol compound is more than or equal to 35° C.

Hereinafter, the alcohol compound (excluding a polymer) having the melting point of more than or equal to 35° C. is also referred to as "alcohol compound A". The particles of the raw material powder are also referred to as "raw material particles". Particles of the composite powder include the raw material particles and alcohol compound A adhering to the surfaces of the raw material particles. Hereinafter, the particles of the composite powder are also referred to as "composite particles".

In the composite powder obtained by adding alcohol compound A as an additive to the raw material powder, higher weighing stability (fluidity) can be achieved. This makes it possible to reduce variation in mass of a compact and the porous body (anode body). Furthermore, in a case where a small amount of alcohol compound A is added, sufficiently higher weighing stability of the powder can be achieved, a content of carbon derived from the additive of the porous body can be reduced, and an increase in leakage current due to a large content of the carbon can be suppressed.

Note that high weighing stability of the powder means that variation in an amount of the powder filled in a weighing hole is small when the powder is weighed by filling the weighing hole of a weighing jig with the powder using a grinding jig. The powder is weighed by, for example, filling weighing hole 420a with powder 300 in FIG. 2A.

In a case where the variation in mass of the porous body is large, variation in surface area of the porous body (anode body) becomes large, which may increase variation in capacitance of the electrolytic capacitor. In the above case, when a plurality of porous bodies is collectively subjected to an anodizing treatment at the same anodizing voltage, variation in anodizing current between the porous bodies increases, and variation in film quality of an anodization film thus formed increases, which may increase variation in leakage current (LC) of the electrolytic capacitor. As described above, variation in characteristics of the electrolytic capacitor may increase. As a method of reducing the variation in characteristics of the electrolytic capacitor, it is conceivable to take away a compact having out of a predetermined mass range as a defective product in a stage where the compact is obtained, but in the above case, a molding defect rate increases, which is disadvantageous in terms of productivity.

(Raw Material Powder)

The raw material powder contains the valve metal. Examples of the valve metal include aluminum (Al), titanium (Ti), tantalum (Ta), niobium (Nb), zirconium (Zr), and hafnium (Hf). The raw material particles may be particles of the valve metal, particles of an alloy containing the valve metal, or particles of a compound containing the valve metal. Only one of these kinds of particles may be used, or two or more thereof may be used in mixture.

An average particle diameter of the raw material powder may be 100 m or less or may be 80 m or less. In this case, it is possible to suppress an increase in density variation of the compact due to partial uneven distribution of coarse particles in the compact, and dimensional variation of the compact can also be reduced by improving flatness of a surface of the compact. In addition, it is relatively difficult to set an average particle diameter to 100 m or more with a powder having a coefficient of variation (CV) value of 100 FV/g (100 kCV) or more, and thus, there is also an advantage that options for selecting the raw material powder increase. The higher weighing stability of the raw material powder having an average particle diameter of 100 m or less can be achieved by adding alcohol compound A. If camphor is added to the raw material powder having the average particle diameter of 100 m or less, the weighing stability of the powder may be deteriorated.

Further, the average particle diameter of the raw material powder may be 10 m or more from the viewpoint that the powder can be suppressed from soaring to the atmosphere. In this case, it is possible to suppress a decrease in the powder due to soaring of the powder to the atmosphere when the powder is transferred from a container to another container, and it is also possible to mitigate a risk that a worker inhales the powder. In addition, it is also possible to suppress dissipation of particles from a gap of a molded member due to a small particle size.

The average particle diameter referred to herein is a median diameter (D50) in a volume-based particle size distribution obtained with a laser diffraction particle size distribution analyzer.

(Alcohol Compound A)

The melting point of alcohol compound A is more than or equal to 35° C. and is stably in a solid state at the room temperature. Therefore, the composite powder can be obtained as a powder in a dry state, and excellent weighing stability can be secured. The melting point of alcohol compound A may be more than or equal to 40° C., or may be more than or equal to 45° C.

From the viewpoint of productivity in a step of removing alcohol compound A, which will be described later, the melting point of alcohol compound A is preferably less than or equal to 120° C., more preferably less than or equal to 100° C., still more preferably less than or equal to 90° C., and particularly preferably less than or equal to 80° C. When the melting point of alcohol compound A is within the above range, it is possible to prevent alcohol compound A from being fixed to an inner wall of a pipe from a removal furnace of alcohol compound A to a recovery tank by keeping the pipe at the temperature ranging about from 120° C. to 150° C. in the step of removing alcohol compound A using equipment of FIG. 3. Further, it is not necessary to dispose a pipe having a heat resistant structure or to add equipment for raising the temperature of the pipe to more than or equal to 150° C., which is advantageous in terms of cost.

A boiling point of alcohol compound A is preferably less than or equal to 400° C. In the step of removing alcohol compound A, alcohol compound A can be removed by evaporation at a temperature of 400° C. to 500° C. Such a temperature range is substantially the same as a temperature range in which camphor is removed by evaporation and a temperature range in which an acrylic resin is removed by thermal decomposition and evaporation, and equipment for use of the camphor or the acrylic resin as the additive can be used as it is.

Alcohol compound A does not contain a polymer. Examples of the polymer include polyvinyl alcohol, polyalkylene glycol (such as polyethylene glycol), cellulose, and the like. If the additive is the polymer, an amount of the additive added to the raw material powder in order to improve the weighing stability increases, and the carbon content of the porous body may increase. When the composite powder is obtained using the polymer, an agglomerate (for example, 300 m or more) of particles that firmly adhere by the polymer is likely to be formed after a step of removing a solvent. The agglomerate is likely to cause a problem that variation in filling of the weighing hole with powder increases, that a locally dense portion is formed inside the compact, or that a sintered body having an irregular shape is formed. Therefore, it is necessary to separately provide a step of removing the agglomerate, which leads to a loss of the powder and is disadvantageous in terms of productivity. In general, the polymer is decomposed by heating to be decomposed into a plurality of substances, and a decomposition product thereof evaporates. Further, the polymer or the decomposition product thereof reacts with oxygen by combustion to generate $CO_2$, $H_2O$, and the like, and the polymer is removed as these evaporate. There is almost no oxygen in a step of removing the polymer under reduced pressure, and thus, a decomposition product that does not evaporate remains as it is, and a carbon content after sintering is likely to increase. In particular, in polyvinyl alcohol, it is known that a large amount of acetaldehyde, which is pointed out to be carcinogenic, is generated by thermal decomposition under low oxygen partial pressure, and it is necessary to perform a treatment such as separately burning a substance recovered in the recovery tank in the atmosphere.

The number of carbon atoms of alcohol compound A is, for example, 6 or more. Alcohol compound A may be used alone or in combination of two or more kinds thereof. Alcohol compound A preferably contains at least one selected from the group consisting of monohydric alcohol compound A and dihydric alcohol compound A.

Examples of monohydric alcohol compound A include 1-tetradecanol, 1-pentadecanol, 1-hexadecanol, 1-heptadecanol, 1-octadecanol, 1-nonadecanol, 1-icosanol, 1-docosanol, 1-tetracosanol, 1-hexacosanol, 1-octacosanol, 1-triacontanol, and the like. Among them, 1-hexadecanol and 1-octadecanol are preferable, and 1-hexadecanol is more preferable from the viewpoints of low harmfulness, high solubility into a solvent, ease of acquisition, cost reduction, and the like.

Examples of dihydric alcohol compound A include 1,2-hexanediol, 1,6-hexanediol, 2,5-hexanediol, 2,3-dimethyl-2, 3-butanediol, 2,2-diethyl-1,3-propanediol, 2-methyl-2-propyl-1,3-propanediol, 1,8-octanediol, 2,5-dimethyl-2,5-hexanediol, 2,2,4-trimethyl-1,3-pentanediol, 1,9-nonanediol, 2-butyl-2-ethyl-1,3-propanediol, 1,10-decanediol, 1,12-dodecanediol, 1,14-tetradecanediol, 1,2-hexadecanediol, 1,16-hexadecanediol, and the like. Among them, 1,6-hexanediol, 1,10-decanediol, and 2,5-dimethyl-2, 5-hexanediol are preferable from the viewpoints of low harmfulness, high solubility into a solvent, low flammability, high chemical stability, ease of storage (no need for cold storage), ease of acquisition, cost reduction, and the like.

A content of alcohol compound A in the composite powder is preferably more than or equal to 0.002 parts by mass and less than or equal to 0.1 parts by mass with respect to 100 parts by mass of the raw material powder. When the content of alcohol compound A is less than or equal to 0.1 parts by mass, the carbon content of the porous body is sufficiently reduced, and the leakage current is sufficiently reduced. Further, the strength of the compact is sufficiently secured. When the content of alcohol compound A is more than or equal to 0.002 parts by mass, the weighing stability of the composite powder is easily improved. The content of alcohol compound A is more preferably more than or equal to 0.002 parts by mass and less than or equal to 0.05 parts by mass from the viewpoint of further reducing the carbon content of the porous body. The content of alcohol compound A is more preferably more than or equal to 0.005 parts by mass and less than or equal to 0.1 parts by mass from the viewpoint of further improving the weighing stability of the powder. The content of alcohol compound A is particularly preferably more than or equal to 0.005 parts by mass and less than or equal to 0.05 parts by mass.

If the additive is an acrylic resin, the carbon content of the porous body increases, and the leakage current may increase. Although the detailed reason is unknown, it is presumed that it is necessary to add a large amount of the acrylic resin (for example, add more than or equal to 1 part by mass of the acrylic resin with respect to 100 parts by mass of the raw material powder) in order to improve the weighing stability, and it is difficult to remove a thermal decomposition product by thermal decomposition in a step of removing the additive.

A content (content with respect to 100 parts by mass of the raw material powder) of the additive (alcohol compound) in the composite powder can be obtained as follows. The composite powder is put into an organic solvent such as ethanol, and is stirred. After that, the composite powder is separated into a raw material powder (for example, Ta powder) and a liquid (alcohol solution) by filtration, centrifugation, or the like. The liquid is dried to obtain a precipitate (additive). The mass of the raw material powder and the mass of the precipitate are measured, and a ratio (percentage) of the mass of the precipitate to the mass of the raw material powder is obtained.

A component of the additive can be obtained, for example, by gas chromatography mass spectrometry. Further, the melting point and the boiling point described above are measured by a general method described in, for example, Japanese Industrial Standards (JIS). The melting point may be measured by differential scanning calorimetry (DSC) as necessary. The boiling point may be measured by thermo-gravimetric differential thermal analysis (TG/DTA) as necessary.

[Method of Manufacturing Composite Powder]

A method of manufacturing a composite powder according to an exemplary embodiment of the present disclosure includes: a step of preparing a raw material powder containing a valve metal; a step of preparing a solution of alcohol compound A (hereinafter, also referred to as "alcohol solution A"); a step of mixing the raw material powder and alcohol solution A; and a step of removing a solvent.

When a small amount (for example, less than or equal to 0.1 parts by mass) of alcohol compound A is added to 100 parts by mass of a raw material powder, a homogeneous composite powder can be produced by mixing alcohol compound A in a state of being dissolved in a solvent with the raw material powder to pass through the raw material powder in a wet state (by wet mixing). If a small amount of alcohol compound A and the raw material powder are dry-mixed at a temperature more than or equal to a melting point of alcohol compound A, it is difficult to spread the small amount of melted alcohol compound A over the entire surface of the raw material powder, and it is difficult to produce the homogeneous composite powder. Further, in this method, the melted alcohol compound A is likely to adhere to a wall surface of a mixing container, and a proportion that does not contribute to complexation may increase, and it is difficult to adjust the amount of alcohol compound A included in the composite powder.

(Step of Preparing Raw Material Powder)

As the raw material powder, those exemplified above can be used.

(Step of Preparing Alcohol Solution A)

Alcohol solution A contains alcohol compound A and a solvent. As alcohol compound A, those exemplified above can be used. The concentration of alcohol compound A in the alcohol solution ranges, for example, from 0.01% by mass to 2% by mass, inclusive. The concentration of alcohol compound A in the alcohol solution can be obtained from a content of alcohol compound A in the composite powder and an addition amount of alcohol solution A in a manufacturing process. When it is necessary to lower the concentration of alcohol solution A, the concentration may be reduced by first producing high-concentration alcohol solution A, and then, diluting the solution with the solvent. For example, 1% by mass alcohol solution A may be produced, and then, 1% by mass alcohol solution A and the solvent may be mixed at a mass ratio of 1:9 to produce 0.1% by mass alcohol solution A.

The solvent is not a highly harmful solvent such as toluene, but is preferably a solvent having relatively low harmfulness. Examples of the solvent having relatively low harmfulness include ethanol, isopropanol, and butyl acetate (hereinafter, also referred to as "ethanol and the like"). One of these kinds of solvents may be used alone, or two or more thereof may be used in combination.

A degree of solubility of alcohol compound A in the solvent is preferably more than or equal to 10 mass %, and more preferably more than or equal to 15 mass %. In this case, a dissolution rate of alcohol compound A in the solvent is high, and alcohol solution A can be easily produced. In this case, the occurrence of mixing unevenness is sufficiently suppressed, and the raw material particles and alcohol compound A are easily mixed homogeneously. A degree of solubility of alcohol compound A is preferably more than or equal to 10% by mass (or more than or equal to 15% by mass) in at least one solvent selected from the group consisting of ethanol, isopropanol, and butyl acetate.

Note that the degree of solubility referred to herein is a value obtained by $(M2/(M1+M2))\times100$ when M2 (g) is the maximum value of the mass of alcohol compound A dissolved in the solvent (temperature 25° C.) having mass M1 (g).

If the degree of solubility of the additive in the solvent is low, along time is required at the time of preparing an additive solution, the solvent volatilizes at the time of mixing the additive solution and the raw material powder, a part of the additive is precipitated on the wall surface of the mixing container, so that the mixing unevenness may occur. If the additive is stearic acid, stearic acid has a low degree of solubility in ethanol or the like, a long time is required to prepare a stearic acid solution using ethanol or the like, and a white solid substance is likely to adhere to the wall surface of the mixing container at the time of mixing the stearic acid solution and the raw material powder, so that the mixing unevenness is likely to occur.

(Step of Mixing Raw Material Powder and Alcohol Solution A)

This step is a step of wet-mixing the raw material powder and alcohol compound A. That is, in the mixing step, an alcohol solution is added to the raw material powder while stirring the raw material powder to obtain the raw material powder in the wet state.

The addition amount of alcohol compound A is preferably more than or equal to 0.002 parts by mass and less than or equal to 0.1 parts by mass with respect to 100 parts by mass of the raw material powder. When the addition amount of alcohol compound A is less than or equal to 0.1 parts by mass, the carbon content of the porous body is sufficiently reduced, the strength of the compact is sufficiently secured, and the occurrence of a crack or a partial chipping in the sintered body due to a decrease in strength is sufficiently suppressed. When the addition amount of alcohol compound A is more than or equal to 0.002 parts by mass, it is easy to obtain a composite powder excellent in weighing stability.

The addition amount of alcohol solution A is preferably more than or equal to 5 parts by mass and less than or equal to 20 parts by mass with respect to 100 parts by mass of the raw material powder from the viewpoint of sufficiently suppressing the occurrence of mixing unevenness and easily obtaining a homogeneous composite powder. When the addition amount of alcohol solution A is within the above range, it is easy to adjust the entire raw material powder to an appropriately wet state. When the addition amount of alcohol solution A is small, it may be difficult for alcohol compound A to uniformly spread throughout the raw material powder. When the addition amount of alcohol solution A is large, the raw material powder becomes a slurry state, and a large amount of alcohol solution A or the raw material powder may adhere to the wall surface of the mixing container, and a large amount of alcohol compound A may be precipitated on the wall surface of the mixing container during drying (in the step of removing the solvent).

(Step of Removing Solvent)

In the step of removing the solvent, the raw material powder in the wet state is dried while being stirred to remove the solvent, thereby obtaining a composite powder. The composite powder contains the raw material powder and an alcohol compound adhering to surfaces of particles of the raw material powder. Drying can be performed by heating, pressure reduction, or the like. When the solvent is ethanol, drying by heating may be performed at the temperature ranging about from 50° C. to 90° C.

When drying by heating is performed, it is preferable to maintain a stirring state until the temperature of the raw material powder falls below the melting point of alcohol compound A. If stirring is stopped until the temperature of the raw material powder falls below the melting point of alcohol compound A, alcohol compound A in a molten state may move to cause the mixing unevenness.

Here, FIG. 1 is a view illustrating an example of wet mixing of a raw material powder and alcohol compound A. Raw material powder 100 is placed in mixing container 110. Solution 200 of alcohol compound A is added to raw material powder 100 while stirring raw material powder 100. In this manner, raw material powder 100 in a wet state is obtained. Thereafter, raw material powder 100 in the wet state placed in mixing container 110 is dried while being stirred to remove a solvent. In this manner, a composite powder is obtained.

[Method of Manufacturing Anode Body for Electrolytic Capacitor]

A method of manufacturing an anode body for an electrolytic capacitor according to an exemplary embodiment of the present disclosure includes: a step of preparing a composite powder; a step of molding the composite powder; a step of removing alcohol compound A; a step of sintering a compact; and a step of forming a dielectric layer.

(Step of Preparing Composite Powder)

In this step, a composite powder of the present disclosure is prepared. In this step, for example, the composite powder obtained by the above-described manufacturing method is prepared.

(Step of Molding Composite Powder)

In the step of molding the composite powder, the composite powder is filled in a predetermined mold and compression-molded to obtain a compact. The compact includes alcohol compound A. In this step, a part of an anode wire may be embedded in the compact.

Figure 2A:
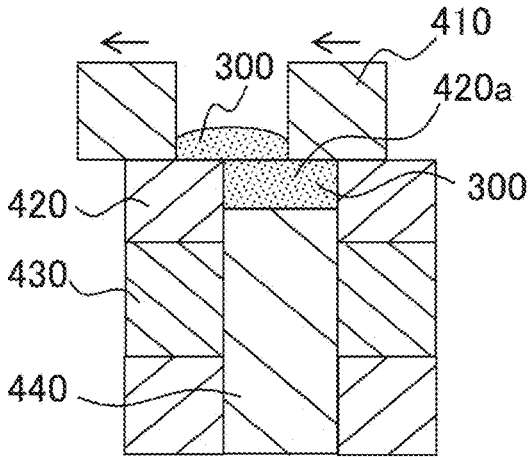
FIG. 2A is a view illustrating a state during weighing of a composite powder in a process of producing compact A from the composite powder.
Figure 2B:
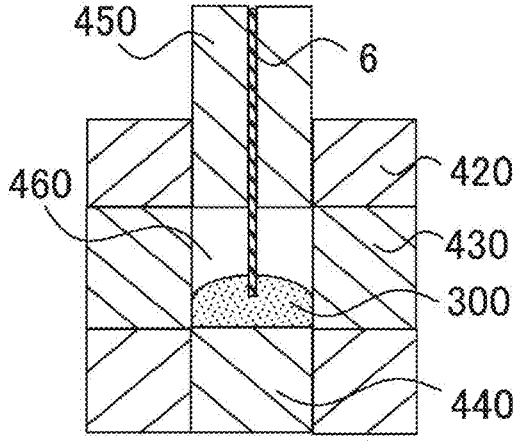
FIG. 2B is a view illustrating a state before compression-molding of the composite powder in the process of producing compact A from the composite powder.
Figure 2C:
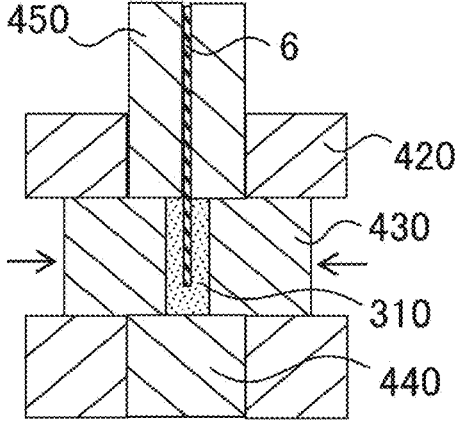
FIG. 2C is a view illustrating a state during compression-molding of the composite powder in the process of producing compact A from the composite powder.

FIGS. 2A to 2C are views illustrating an example of a process of producing the compact from the composite powder.

First, as illustrated in FIG. 2A, composite powder 300 is put into weighing hole 420a formed by weighing mold 420 and lower mold 440. Weighing hole 420a has a constant volume. Weighing hole 420a is filled with composite powder 300 using grinding slider 410. At this time, since composite powder 300 containing alcohol compound A is excellent in weighing stability, it is possible to stably perform weighing by filling weighing hole 420a with powder 300 using grinding slider 410. That is, variation in an amount of powder filled in weighing hole 420a can be reduced. As a result, variation in mass can be reduced for each of the compact, a porous body, and a sintered body produced in the subsequent steps.

Next, as illustrated in FIG. 2B, weighed composite powder 300 is disposed in predetermined space 460 formed by press mold 430 and lower mold 440. Thereafter, upper mold 450 is disposed above space 460, and anode wire 6 is inserted into a predetermined hole of upper mold 450 to dispose a part of the anode wire 6 in space 460.

Next, as illustrated in FIG. 2C, press mold 430 is moved in a direction of an arrow to compression-mold composite powder 300. In this manner, compact 310 in which a part of anode wire 6 is embedded is formed.

(Step of Removing Alcohol Compound A)

In the step of removing alcohol compound A, alcohol compound A included in the compact is removed. For example, alcohol compound A included in the compact can be vaporized and removed. More specifically, the removal can be performed, for example, by heating the compact to a predetermined temperature (a temperature more than or equal to a boiling point of alcohol compound A) under reduced pressure. When the boiling point of alcohol compound A is less than or equal to 400° C., alcohol compound A can be removed at a temperature ranging about from 400° C. to 500° C. under reduced pressure. Note that the removing step under reduced pressure may be performed under vacuum or under an atmosphere in which a small amount of inert gas, such as Ar gas, is caused to flow in while performing vacuuming by a vacuum pump.

In a case where a small amount of alcohol compound A is added, the weighing stability of the powder can be sufficiently enhanced, and thus, the amount of alcohol compound A remaining in the compact without being removed in the removing step can be sufficiently reduced. As a result, a content of carbon derived from alcohol compound A in the sintered body obtained in the subsequent step can be sufficiently reduced.

(Step of Sintering Compact)

In the step of sintering the compact, the compact from which alcohol compound A has been removed is sintered to obtain the porous body (sintered body). Details of the porous body will be described later. The compact can be sintered, for example, at a temperature ranging from 1200° C. to 1500° C. under reduced pressure. Note that the sintering step under reduced pressure is preferably performed under high vacuum.

Figure 3:
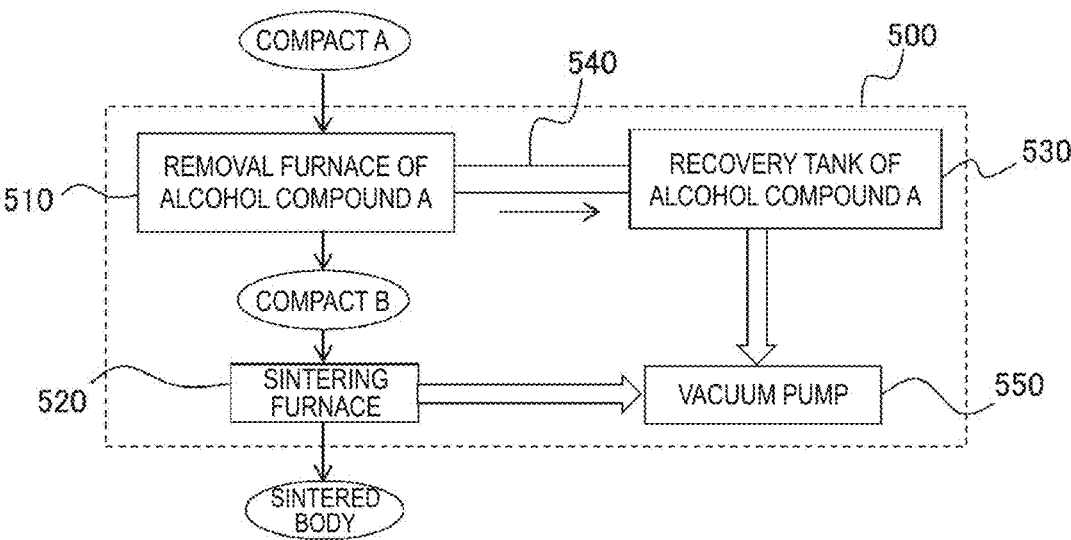
FIG. 3 is a configuration diagram illustrating an example of equipment used in a step of removing alcohol compound A and a step of sintering a compact.

FIG. 3 is a configuration diagram illustrating an example of equipment used in the step of removing alcohol compound A and the step of sintering the compact. In FIG. 3, compact A is a compact including alcohol compound A, and compact B is a compact obtained after a process of removing alcohol compound A.

Equipment 500 includes removal furnace 510 for removing alcohol compound A from compact A to obtain compact B, sintering furnace 520 for sintering compact B, recovery tank 530 for recovering alcohol compound A removed from compact A, heat insulation pipe 540, and vacuum pump 550. Heat insulation pipe 540 is disposed between removal furnace 510 and recovery tank 530.

The inside of heat insulation pipe 540 is adjusted to a temperature more than or equal to a melting point of alcohol compound A. This suppresses precipitation of alcohol compound A in pipe 540. For example, when the melting point of alcohol compound A is less than or equal to 100° C., the temperature inside pipe 540 may be kept at a temperature ranging about from 120° C. to 150° C. In this case, it is not necessary to provide a pipe having a special heat-insulating structure, which is advantageous in terms of manufacturing cost.

Heat insulation pipe 540 and recovery tank 530 are disposed between removal furnace 510 and vacuum pump 550. The inside of each of removal furnace 510, heat insulation pipe 540, and recovery tank 530 is adjusted to a reduced pressure state by vacuum pump 550. Sintering furnace 520 is also adjusted to a reduced pressure state by vacuum pump 550. Recovery tank 530 is cooled with liquid nitrogen or the like, and alcohol compound A is solidified and recovered. Note that valves may be provided, respectively, between removal furnace 510 and sintering furnace 520, between removal furnace 510 and heat insulation pipe 540, between heat insulation pipe 540 and recovery tank 530, between recovery tank 530 and vacuum pump 550, and between sintering furnace 520 and vacuum pump 550. The valves may be open and closed according to a place, timing, or the like at which pressure reduction is required.

Hereinafter, the removing step and the sintering step using the equipment of FIG. 3 will be described.

Compact A is supplied to removal furnace 510 under reduced pressure, and alcohol compound A is removed from compact A, whereby compact B is produced. Next, compact B is supplied to sintering furnace 520 under reduced pressure and sintered, whereby the sintered body is produced. On the other hand, alcohol compound A removed by evaporation in removal furnace 510 passes through heat insulation pipe 540 and is recovered in recovery tank 530.

Although the removal furnace and the sintering furnace are separately provided in FIG. 3, the single furnace serving as both the removal furnace and the sintering furnace may be provided. That is, the removing step and the sintering step may be performed by the single furnace. One or both of the removal furnace and the sintering furnace may be configured using one furnace or a plurality of furnaces. In addition, as for the vacuum pump, a vacuum pump connected to the recovery tank and a vacuum pump connected to the sintering furnace may be separately provided.

(Step of Forming Dielectric Layer)

In the step of forming the dielectric layer, the dielectric layer is formed on a surface of the porous body to obtain an anode body. The dielectric layer is formed by, for example, an anodizing treatment. Details of the dielectric layer will be described later.

Hereinafter, the electrolytic capacitor will be described in detail.

[Electrolytic Capacitor]

The electrolytic capacitor includes a capacitor element. The capacitor element includes the anode body and a cathode. The anode body includes the porous body and the dielectric layer covering the surface of the porous body. The cathode is formed so as to cover the dielectric layer. The cathode includes at least a solid electrolyte layer.

The anode body may include a rod-shaped anode wire partially embedded in the porous body. In a case where the porous body is a rectangular parallelepiped, the anode wire is planted from one end surface of the rectangular parallelepiped. The anode wire may contain a valve metal. A part of the anode wire is embedded in the porous body, and the remaining part protrudes from the porous body. The remaining part is connected to an anode lead terminal by welding or the like.

(Porous Body)

The porous body includes a valve metal. Examples of the valve metal include aluminum (Al), titanium (Ti), tantalum (Ta), niobium (Nb), zirconium (Zr), and hafnium (Hf).

The porous body is a sintered product of a compact of raw material particles (raw material powder) containing the valve metal. The particles may be particles of the valve metal, particles of an alloy containing the valve metal, or particles of a compound containing the valve metal. Only one of these kinds of particles may be used, or two or more thereof may be used in mixture.

The porous body can be obtained by compression-molding the raw material particles into a predetermined shape to obtain the compact and sintering the compact. For example, the compact may be obtained by disposing the anode wire at a predetermined position of a mold, inserting the raw material particles into the mold, and performing compression-molding. The porous body in which a part of the anode wire is embedded may be obtained by sintering the compact. The porous body is usually a rectangular parallelepiped.

(Dielectric Layer)

The dielectric layer is formed to cover the outer surface of the porous body and inner wall surfaces of pores of the porous body. For example, the dielectric layer is formed by performing an anodizing treatment on the porous body and causing a growth of an oxide film at a surface of the porous body. The anodizing treatment may be performed by immersing the porous body in an anodizing solution and performing anodic oxidation on the surface of the porous body. Alternatively, the porous body may be heated under an atmosphere containing oxygen to oxidize the surface of the porous body.

(Solid Electrolyte Layer)

The solid electrolyte layer is disposed to cover at least a part of the dielectric layer. The solid electrolyte layer may be filled in the pores of the porous body with the dielectric layer interposed therebetween and be formed on the outer surface of the porous body. The solid electrolyte layer may be a stack of two or more different solid electrolyte layers.

The solid electrolyte layer contains a conductive polymer. The conductive polymer may be a π-conjugated polymer, and examples of the conductive polymer include polypyrrole, polythiophene, polyaniline, and derivatives thereof. These may be used alone or in combination of a plurality of kinds. The conductive polymer may be a copolymer of two or more monomers. Note that, a derivative of the conductive polymer means a polymer having the conductive polymer as a basic skeleton. Examples of a derivative of polythiophene include poly(3,4-ethylenedioxythiophene) (PEDOT).

A dopant may be added to the conductive polymer. That is, the solid electrolyte layer may contain the conductive polymer and the dopant. The conductive polymer may be included in the solid electrolyte layer in a state of being doped with the dopant. The dopant can be selected depending on the conductive polymer, and a known dopant may be used. Examples of the dopant include benzenesulfonic acid, alkylbenzenesulfonic acid, naphthalenesulfonic acid, alkylnaphthalenesulfonic, polystyrenesulfonic acid (PSS), and salts thereof. The solid electrolyte layer contains, for example, PEDOT doped with PSS.

The solid electrolyte layer containing the conductive polymer can be formed, for example, by impregnating a porous body (anode body) having a dielectric layer formed on a surface thereof with a first treatment liquid containing a monomer (or oligomer) and then polymerizing the monomer (or oligomer) by electrolytic polymerization or chemical polymerization. In the case of chemical polymerization, the first treatment liquid contains, for example, a monomer (or oligomer), an oxidizing agent, and a solvent (or dispersion medium). Examples of the monomer include 3,4-ethylenedioxythiophene (EDOT) and pyrrole. The first treatment liquid may further contain a dopant.

Alternatively, the solid electrolyte layer may be formed by impregnating a porous body (anode body) having a dielectric layer formed on a surface thereof with a treatment liquid containing a conductive polymer and drying the treatment liquid. The treatment liquid contains, for example, a conductive polymer, a solvent (or a dispersion medium), and a dopant as necessary.

(Others)

The capacitor element may include a cathode layer covering at least a part of the solid electrolyte layer. The electrolytic capacitor may include an anode lead terminal and a cathode lead terminal, which are electrically connected to the capacitor element, and an outer packaging resin disposed around the capacitor element. The cathode lead terminal is connected to a cathode via a conductive member. The anode lead terminal is connected to an end of the anode wire protruding from the porous body. The shape, size, and the like of the capacitor element are not particularly limited, and a known capacitor element or a capacitor element that has a similar configuration may be used.

(Cathode Layer)

The cathode layer may include a carbon layer formed on the solid electrolyte layer and a metal paste layer formed on the carbon layer. The carbon layer may be made of a conductive carbon material such as graphite and a resin. The metal paste layer may be made of metal particles (for example, silver particles) and a resin, and may be made of, for example, a known silver paste.

(Conductive Member)

The cathode layer is connected to a connecting part of the cathode lead terminal by the conductive member. That is, the cathode layer (cathode) is electrically connected to the cathode lead terminal. The conductive member is made of a material having conductivity. The conductive member may be made of a material containing metal particles (for example, silver particles) and a resin, and may be made of, for example, a known metal paste (for example, silver paste). The conductive member is formed by heating the metal paste. Note that the conductive member may include a plurality of conductive layers of different kinds.

(Outer Packaging Resin)

The outer packaging resin is disposed around the capacitor element so that the capacitor element is not exposed on a surface of the electrolytic capacitor. Furthermore, the outer packaging resin insulates the anode lead terminal from the cathode lead terminal. As the outer packaging resin, known outer packaging resin used for an electrolytic capacitor may be applied. For example, the outer packaging resin may be formed using an insulating resin material used for sealing the capacitor element. The outer packaging resin may be formed by placing the capacitor element in a mold, introducing an uncured thermosetting resin and a filler into the mold in accordance with a transfer molding method, a compression molding method, or the like, and then performing curing.

Examples of the outer packaging resin include an epoxy resin, a phenol resin, a silicone resin, a melamine resin, a urea resin, an alkyd resin, polyurethane, polyimide, unsaturated polyester, and the like. The outer packaging resin may contain a substance (such as an inorganic filler) other than the resin.

(Cathode Lead Terminal)

A part of the cathode lead terminal is exposed from the outer packaging resin, and is used as a cathode external terminal. A material of the cathode lead terminal may be any material that can be used as a material of the cathode lead terminal of the electrolytic capacitor. For example, a known cathode lead terminal material used in an electrolytic capacitor may be used. The cathode lead terminal may be formed by, for example, processing a metal sheet (including a metal plate and a metal foil) made of a metal (copper, a copper alloy, or the like) by a known metal processing method.

(Anode Lead Terminal)

A part of the anode lead terminal is exposed from the outer packaging resin, and is used as an anode external terminal. A material of the anode lead terminal may be any material that can be used as a material of the anode lead terminal of the electrolytic capacitor. For example, a known anode lead terminal material used for the electrolytic capacitor may be used. The anode lead terminal may be formed by, for example, processing a metal sheet (including a metal plate and a metal foil) made of a metal (copper, a copper alloy, or the like) by a known metal processing method.

Figure 4:
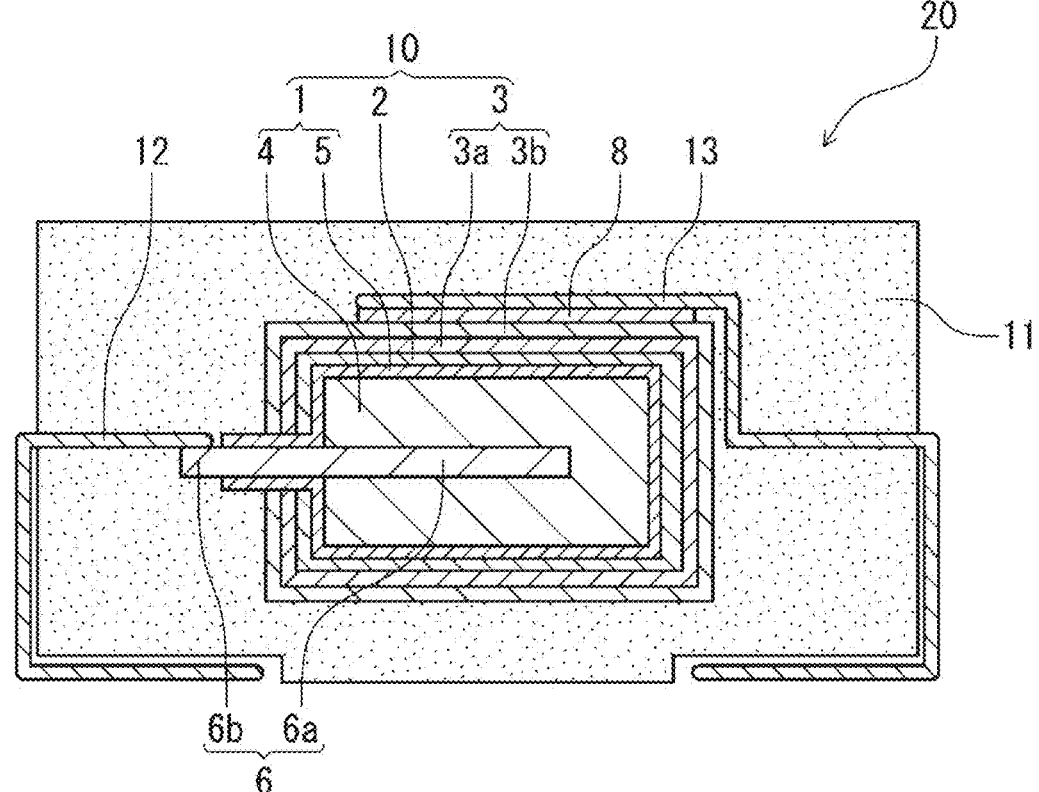
FIG. 4 is a cross-sectional view schematically illustrating an electrolytic capacitor according to an exemplary embodiment of the present disclosure.

FIG. 4 is a cross-sectional view schematically illustrating an example of the electrolytic capacitor according to the present exemplary embodiment. The electrolytic capacitor according to the present embodiment is not limited thereto.

Electrolytic capacitor 20 includes capacitor element 10, outer packaging resin 11 that seals capacitor element 10, and anode lead terminal 12 and cathode lead terminal 13 which are electrically connected to capacitor element 10. A part of each of anode lead terminal 12 and a part of cathode lead terminal 13 are individually exposed from outer packaging resin 11. A part of anode lead terminal 12 and a part of cathode lead terminal 13 are covered with outer packaging resin 11 together with capacitor element 10.

Capacitor element 10 includes anode body 1, solid electrolyte layer 2 formed on anode body 1, and cathode layer 3 formed on solid electrolyte layer 2. Anode body 1 includes porous body 4 containing a valve metal, and dielectric layer 5 covering porous body 4. Dielectric layer 5 is formed to cover an outer surface of porous body 4 and inner wall surfaces of pores.

Porous body 4 has a substantially rectangular parallelepiped shape and has six side surfaces. A part of anode wire 6 extends from one side surface of porous body 4. That is, anode wire 6 includes first portion 6a embedded in porous body 4 from one side surface of porous body 4, and second portion 6b extending from one side surface of porous body 4. Second portion 6b is joined to anode lead terminal 12 by welding or the like.

Solid electrolyte layer 2 is formed to cover at least a part of dielectric layer 5. Solid electrolyte layer 2 is filled in the pores of porous body 4 (anode body 1). Solid electrolyte layer 2 is formed to cover the outer surface of porous body 4 and the inner wall surfaces of the pores with dielectric layer 5 interposed therebetween.

Cathode layer 3 is formed to cover a surface of solid electrolyte layer 2. Cathode layer 3 includes, for example, carbon layer 3a formed to cover solid electrolyte layer 2 and metal paste layer 3b formed on a surface of carbon layer 3a. Cathode lead terminal 13 is joined to cathode layer 3 (metal paste layer 3b) with conductive member 8 interposed therebetween. Carbon layer 3a contains a conductive carbon material such as graphite and a resin. Metal paste layer 3b contains, for example, metal particles (for example, silver) and a resin. Note that a configuration of cathode layer 3 is not limited to this configuration. The configuration of cathode layer 3 only needs to have a current collecting function.

Note

The above description of the exemplary embodiment discloses the following technologies.

(Technology 1)

A composite powder for manufacturing a porous body included in an anode body of an electrolytic capacitor,
the composite powder including a raw material powder
containing a valve metal and an alcohol compound
adhering to a surface of a particle of the raw material
powder, the alcohol compound excluding a polymer,
wherein a melting point of the alcohol compound is more
than or equal to 35° C.

(Technology 2)

The composite powder according to Technology 1, wherein the melting point of the alcohol compound is more than or equal to 35° C. and less than or equal to 120° C.

(Technology 3)

The composite powder according to Technology 1 or 2, wherein a boiling point of the alcohol compound is less than or equal to 400° C.

(Technology 4)

The composite powder according to any one of Technologies 1 to 3, wherein the alcohol compound contains at least one selected from the group consisting of a monohydric alcohol compound and a dihydric alcohol compound.

(Technology 5)

The composite powder according to Technology 4, wherein the monohydric alcohol compound contains at least one selected from the group consisting of 1-tetradecanol, 1-pentadecanol, 1-hexadecanol, 1-heptadecanol, 1-octadecanol, 1-nonadecanol, 1-icosanol, 1-docosanol, 1-tetracosanol, 1-hexacosanol, 1-octacosanol, and 1-triacontanol.

(Technology 6)

The composite powder according to Technology 4, wherein the dihydric alcohol compound contains at least one selected from the group consisting of 1,2-hexanediol, 1,6-hexanediol, 2,5-hexanediol, 2,3-dimethyl-2,3-butanediol, 2,2-diethyl-1,3-propanediol, 2-methyl-2-propyl-1,3-propanediol, 1,8-octanediol, 2,5-dimethyl-2,5-hexanediol, 2,2,4-trimethyl-1,3-pentanediol, 1,9-nonanediol, 2-butyl-2-ethyl-1,3-propanediol, 1,10-decanediol, 1,12-dodecanediol, 1,14-tetradecanediol, 1,2-hexadecanediol, and 1,16-hexadecanediol.

(Technology 7)

The composite powder according to any one of Technologies 1 to 6, wherein a content of the alcohol compound in the composite powder is more than or equal to 0.002 parts by mass and less than or equal to 0.1 parts by mass with respect to 100 parts by mass of the raw material powder.

(Technology 8)

The composite powder according to any one of Technologies 1 to 7, wherein a degree of solubility of the alcohol compound in at least one solvent selected from the group consisting of ethanol, isopropanol, and butyl acetate is more than or equal to 10% by mass.

(Technology 9)

The composite powder according to any one of Technologies 1 to 8, wherein the anode body includes the porous body containing the valve metal and a dielectric layer covering a surface of the porous body.

(Technology 10)

A method of manufacturing a composite powder for manufacturing a porous body included in an anode body of an electrolytic capacitor, the method including:

a step of preparing a raw material powder containing a valve metal;

a step of preparing an alcohol solution containing a solvent and an alcohol compound having a melting point of more than or equal to 35° C., the alcohol compound excluding a polymer;

a step of adding the alcohol solution to the raw material powder while stirring the raw material powder to obtain the raw material powder in a wet state; and a step of removing the solvent by drying the raw material powder in the wet state while stirring the raw material powder to obtain a composite powder, wherein the composite powder contains the raw material powder and the alcohol compound adhering to a surface of a particle of the raw material powder.

(Technology 11)

The method of manufacturing a composite powder according to Technology 10, wherein the melting point of the alcohol compound is more than or equal to 35° C. and less than or equal to 120° C.

(Technology 12)

The method of manufacturing a composite powder according to Technology 10 or 11, wherein a boiling point of the alcohol compound is less than or equal to 400° C.

(Technology 13)

The method of manufacturing a composite powder according to any one of Technologies 10 to 12, wherein the alcohol compound contains at least one selected from the group consisting of a monohydric alcohol compound and a dihydric alcohol compound.

(Technology 14)

The method of manufacturing a composite powder according to Technology 13, wherein the monohydric alcohol compound contains at least one selected from the group consisting of 1-tetradecanol, 1-pentadecanol, 1-hexadecanol, 1-heptadecanol, 1-octadecanol, 1-nonadecanol, 1-icosanol, 1-docosanol, 1-tetracosanol, 1-hexacosanol, 1-octacosanol, and 1-triacontanol.

(Technology 15)

The method of manufacturing a composite powder according to Technology 13, wherein the dihydric alcohol compound contains at least one selected from the group consisting of 1,2-hexanediol, 1,6-hexanediol, 2,5-hexanediol, 2,3-dimethyl-2,3-butanediol, 2,2-diethyl-1,3-propanediol, 2-methyl-2-propyl-1,3-propanediol, 1,8-octanediol, 2,5-dimethyl-2,5-hexanediol, 2,2,4-trimethyl-1,3-pentanediol, 1,9-nonanediol, 2-butyl-2-ethyl-1,3-propanediol, 1,10-decanediol, 1,12-dodecanediol, 1,14-tetradecanediol, 1,2-hexadecanediol, and 1,16-hexadecanediol.

(Technology 16)

The method of manufacturing a composite powder according to any one of Technologies 10 to 15, wherein a content of the alcohol compound in the composite powder is more than or equal to 0.002 parts by mass and less than or equal to 0.1 parts by mass with respect to 100 parts by mass of the raw material powder.

(Technology 17)

The method of manufacturing a composite powder according to any one of Technologies 10 to 16, wherein an amount of the alcohol solution added to the raw material powder is more than or equal to 5% by mass and less than or equal to 20% by mass with respect to 100 parts by mass of the raw material powder.

(Technology 18)

The method of manufacturing a composite powder according to any one of Technologies 10 to 17, wherein the solvent contains at least one selected from the group consisting of ethanol, isopropanol, and butyl acetate.

(Technology 19)

The method of manufacturing a composite powder according to any one of Technologies 10 to 18, wherein the anode body includes the porous body containing the valve metal and a dielectric layer covering a surface of the porous body.

(Technology 20)

A method of manufacturing an anode body for an electrolytic capacitor, the method including:

a step of preparing a composite powder that contains a raw material powder containing a valve metal and an alcohol compound adhering to a surface of a particle of the raw material powder, the alcohol compound excluding a polymer;

a step of performing compression-molding after filling a predetermined mold with the composite powder to obtain a compact;

a step of removing the alcohol compound included in the compact;

a step of sintering the compact from which the alcohol compound has been removed to obtain a porous body; and a step of forming a dielectric layer on a surface of the porous body to obtain an anode body, wherein a melting point of the alcohol compound is more than or equal to 35° C.

(Technology 21)

The method of manufacturing an anode body for an electrolytic capacitor according to Technology 20, wherein the melting point of the alcohol compound is more than or equal to 35° C. and less than or equal to 120° C.

(Technology 22)

The method of manufacturing an anode body for an electrolytic capacitor according to Technology 20 or 21, wherein a boiling point of the alcohol compound is less than or equal to 400° C.

(Technology 23)

The method of manufacturing an anode body for an electrolytic capacitor according to any one of Technologies 20 to 22, wherein the alcohol compound contains at least one selected from the group consisting of a monohydric alcohol compound and a dihydric alcohol compound.

(Technology 24)

The method of manufacturing an anode body for an electrolytic capacitor according to Technology 23, wherein the monohydric alcohol compound contains at least one selected from the group consisting of 1-tetradecanol, 1-pentadecanol, 1-hexadecanol, 1-heptadecanol, 1-octadecanol, 1-nonadecanol, 1-icosanol, 1-docosanol, 1-tetracosanol, 1-hexacosanol, 1-octacosanol, and 1-triacontanol.

(Technology 25)

The method of manufacturing an anode body for an electrolytic capacitor according to Technology 23 or 24, wherein the dihydric alcohol compound contains at least one selected from the group consisting of 1,2-hexanediol, 1,6-hexanediol, 2,5-hexanediol, 2,3-dimethyl-2,3-butanediol, 2,2-diethyl-1,3-propanediol, 2-methyl-2-propyl-1,3-propanediol, 1,8-octanediol, 2,5-dimethyl-2,5-hexanediol, 2,2,4-trimethyl-1,3-pentanediol, 1,9-nonanediol, 2-butyl-2-ethyl-1,3-propanediol, 1,10-decanediol, 1,12-dodecanediol, 1,14-tetradecanediol, 1,2-hexadecanediol, and 1,16-hexadecanediol.

(Technology 26)

The method of manufacturing an anode body for an electrolytic capacitor according to any one of Technologies 20 to 25, wherein a content of the alcohol compound in the composite powder is more than or equal to 0.002 parts by mass and less than or equal to 0.1 parts by mass with respect to 100 parts by mass of the raw material powder.

EXAMPLES

Although the present disclosure will be specifically described below based on Examples and Comparative Examples, the present disclosure is not limited to Examples below.

Examples 1 to 13

(Production of Composite Powder)

As a raw material powder, Ta powder (average particle diameter: 80 μm, CV value: 70 kCV) was prepared. As an additive solution, an alcohol solution containing alcohol compound A (additive) and ethanol (solvent) was prepared. As alcohol compound A, 1,10-decanediol (melting point: more than or equal to 70° C.), 2,5-dimethyl-2,5-hexanediol (melting point: more than or equal to 80° C.), or 1-hexadecanol (melting point: more than or equal to 40° C.) was used. All of them have a boiling point of less than or equal to 400° C. and a degree of solubility in ethanol of more than or equal to 10% by mass.

The alcohol solution was added to the raw material powder while stirring the raw material powder to obtain the raw material powder in a wet state (FIG. 1). An addition amount of the alcohol compound was set to values (parts by mass) shown in Table 1 with respect to 100 parts by mass of the raw material powder. Further, the concentration of the alcohol solution was appropriately adjusted so as to set the addition amount of the alcohol solution within the range from 5 parts by mass to 20 parts by mass with respect to 100 parts by mass of the raw material powder.

The raw material powder in the wet state was heated at a temperature of less than or equal to 90° C. to be dried while being stirred to remove the solvent. In this manner, a composite powder (Ta particles having the alcohol compound adhering to surfaces: composite particles) containing the raw material powder and the alcohol compound adhering to the surfaces of particles of the raw material powder was obtained.

(Production of Compact)

A predetermined mold was filled with a predetermined amount of the composite powder by grinding and weighing (FIG. 2A). One end of an anode wire was embedded in a portion filled with the composite powder (FIG. 2B). Thereafter, the composite powder was compression-molded to obtain a compact (FIG. 2C). An outer shape of the compact was a rectangular parallelepiped (0.8 mm×3.7 mm×5.2 mm). As the anode wire, a Ta wire was used.

(Production of Sintered Body)

The alcohol compound included in the compact was removed under reduced pressure at a temperature ranging from 400° C. to 500° C.

Next, the compact from which the alcohol compound had been removed was sintered under reduced pressure at a temperature ranging from 1300° C. to 1400° C. At this time, a sintering temperature and a sintering time were adjusted such that a shrinkage rate was about 10%.

In this manner, a porous body (Ta sintered body) in which a part of the anode wire was embedded was obtained.

Comparative Example 1

As an additive solution, an acrylic resin solution (solvent: toluene) was prepared instead of an alcohol solution. An addition amount of an acrylic resin was 1.5 parts by mass with respect to 100 parts by mass of a raw material powder. Except for the above, each of a composite powder, a compact, and a sintered body was produced in the same manner as in Example 1.

Comparative Example 2

As an additive solution, a camphor solution (solvent: methanol) was prepared instead of an alcohol solution. An addition amount of camphor was 1.5 parts by mass with respect to 100 parts by mass of a raw material powder. Except for the above, each of a composite powder, a compact, and a sintered body was produced in the same manner as in Example 1.

Comparative Example 3

No additive was used. That is, each of a compact and a sintered body was produced in the same manner as in Example 1 except that a raw material powder was used instead of a composite powder.

The compacts and sintered bodies produced in the above Examples and Comparative Examples were evaluated as follows.

[Evaluation]

(Non-Defective Product Rate of Compacts)

300 compacts were produced using an automatic molding machine, and the mass of each of the 300 compacts was measured. Among the 300 compacts, a proportion of the number of compacts whose mass was within ±0.5% of the target mass (non-defective products) was obtained as a non-defective product rate of the compacts. When a powder has high weighing stability, variation in mass of the compacts is reduced, and the non-defective product rate of the compacts increases.

(Crack (Chipping) Occurrence Rate of Compacts)

100 compacts were randomly extracted from the compacts produced as above. A proportion of the number of compacts in which a crack (chipping) occurred among the 100 compacts was obtained as a crack (chipping) occurrence rate (%).

(Carbon Content of Sintered Body)

A carbon content (ppm by mass) of a sintered body was obtained using about 1 g of the sintered body. As a measuring device, a carbon and sulfur analyzer (manufactured by HORIBA, Ltd.) was used.

(LC in Liquid)

A sintered body in which a part of an anode wire was embedded was subjected to an anodizing treatment (anodization). The anodizing treatment was performed in a 0.02% by mass phosphoric acid aqueous solution at an anodizing voltage of 80 V and a temperature of 60° C. A predetermined voltage of less than 80 V was applied to the sintered body (anode body) after the anodizing treatment in the phosphoric acid aqueous solution, and a current value at a time point when a predetermined time had elapsed from the start of the application of the voltage was obtained as a leakage current (LC) in liquid.

(Coefficient of Variation Representing Variation in Amount of Powder Filled in Weighing Hole)

For the composite powders of Examples 4, 9, 11, and 13, a coefficient of variation representing variation in an amount of powder filled in a weighing hole was obtained. In Comparative Example 3, the coefficient of variation was obtained for the raw material powder in the same manner. Weighing stability was evaluated based on the coefficient of variation.

Figure 5:
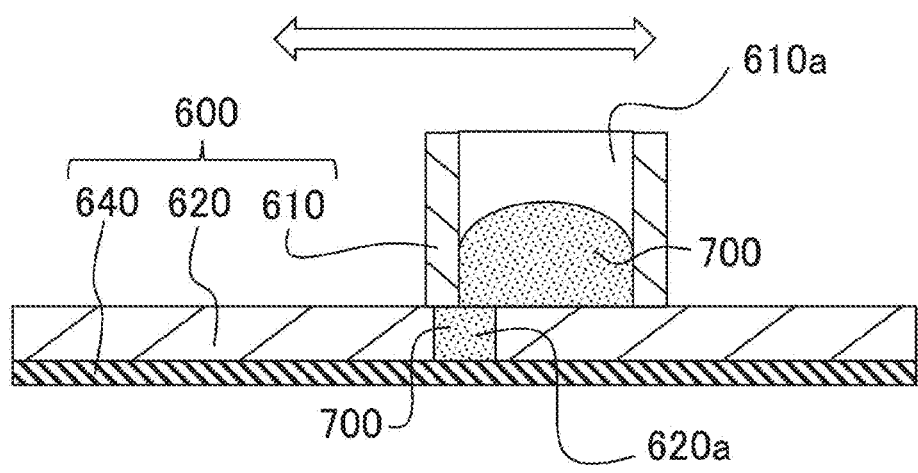
FIG. 5 is a cross-sectional view illustrating a state in which an evaluation jig set for weighing stability is filled with a powder.

The weighing stability was evaluated using an evaluation jig set illustrated in FIG. 5. Note that evaluation jig set 600 of FIG. 5 includes filling jig 610, weighing jig 620, and metal plate 640, and is configured assuming filling of weighing hole 420a with composite powder 300 using grinding slider 410 of FIG. 2A.

Specifically, filling jig 610 that is made of stainless steel and has a hollow cylindrical shape (inner diameter: 20 mm), weighing jig 620 that is made of stainless steel and has a plate shape (thickness: 4 mm) in which weighing hole 620a (diameter: 3 mm) having a circular cross-sectional shape is formed at the center, and metal plate 640 were prepared. As illustrated in FIG. 5, weighing jig 620 was disposed on metal plate 640, and filling jig 610 was disposed on weighing jig 620. Powder 700 in an amount of 2 g was put into hollow portion 610a of filling jig 610, and filling jig 610 was caused to reciprocate three times (in a direction of an arrow illustrated in FIG. 5) so as to pass through weighing hole 620a of weighing jig 620. In this manner, weighing hole 620a was filled with powder 700. Next, powder 700 filled in weighing hole 620a was taken out, and the mass thereof was measured. Such measurement was repeated ten times. A standard deviation and an average value of ten measured values were obtained. As a coefficient of variation (%) representing variation in an amount of powder 700 filled in weighing hole 620a, (standard deviation/average value)×100 was obtained.

Table 1 show evaluation results. An addition amount of an additive in Table 1 represents an amount with respect to 100 parts by mass of a raw material powder.

TABLE 1

| | Additive solution | | Addition amount of additive (parts by mass) | Coefficient of variation representing variation in amount of powder filled in weighing hole (%) | Non-defective product rate of compacts (%) | Crack (chipping) occurrence rate of compacts (%) | Carbon content of sintered body (ppm by mass) | LC in liquid of sintered body (μA) |
|---|---|---|---|---|---|---|---|---|
| | Additive | Solvent | | | | | | |
| Example 1 | 1,10-decanediol | Ethanol | 0.001 | — | 72 | 0 | 52 | 10.5 |
| Example 2 | 1,10-decanediol | Ethanol | 0.002 | — | 95 | 0 | 65 | 10.3 |
| Example 3 | 1,10-decanediol | Ethanol | 0.005 | — | 100 | 0 | 55 | 10.8 |
| Example 4 | 1,10-decanediol | Ethanol | 0.01 | 5 | 100 | 0 | 79 | 10.9 |
| Example 5 | 1,10-decanediol | Ethanol | 0.02 | — | 99 | 0 | 71 | 11.1 |
| Example 6 | 1,10-decanediol | Ethanol | 0.05 | — | 99 | 0 | 94 | 13.6 |
| Example 7 | 1,10-decanediol | Ethanol | 0.1 | — | 99 | 0 | 112 | 17.2 |
| Example 8 | 1,10-decanediol | Ethanol | 0.2 | — | 99 | 2 | 152 | 22.5 |
| Example 9 | 1,6-hexanediol | Ethanol | 0.01 | 8 | 97 | 0 | 50 | 8.6 |
| Example 10 | 1,6-hexanediol | Ethanol | 0.1 | — | 98 | 0 | 41 | 10.9 |
| Example 11 | 2,5-dimethyl-2,5-hexanediol | Ethanol | 0.01 | 6 | 99 | 0 | 50 | 10.4 |
| Example 12 | 2,5-dimethyl-2,5-hexanediol | Ethanol | 0.1 | — | 99 | 0 | 41 | 7.7 |
| Example 13 | 1-hexadecanol | Ethanol | 0.01 | 5 | — | — | — | — |
| Comparative example 1 | Acrylic resin | Toluene | 1.5 | — | 99 | — | 223 | 42.1 |
| Comparative example 2 | Camphor | Methanol | 1.5 | — | 45 | — | 48 | 10.4 |
| Comparative example 3 | No addition | — | — | 15 | 55 | — | 49 | 10.1 |

In Examples 1 to 12, good weighing stability was obtained for the composite powder, the carbon content of the sintered body was reduced, and LC in liquid was reduced. When the addition amount of the alcohol compound was less than or equal to 0.1 parts by mass, no crack (chipping) of the compact was observed (Examples 1 to 7 and 9 to 12). When the addition amount of the alcohol compound was more than or equal to 0.002 parts by mass, the weighing stability was further improved (Examples 2 to 12). Also in Example 13, the improvement of the weighing stability was confirmed since the coefficient of variation was small.

When the additive was the acrylic resin, it was necessary to add a large amount to secure the weighing stability, the carbon content increased, and the LC in liquid increased (Comparative Example 1). When camphor was added to a Ta powder having an average particle diameter of less than 100 m to produce the composite powder, the weighing stability decreased, and a defective product rate of the compacts increased (Comparative Example 2). When the raw material powder (Ta powder) was directly used instead of the composite powder, the weighing stability decreased, and the defective product rate of the compacts increased (Comparative Example 3).

In the composite powders of Examples 4, 9, 11, and 13, the coefficient of variation representing the variation in the amount of the powder filled in the weighing hole was smaller, and the weighing stability was improved as compared with the raw material powder of Comparative Example 3.

A composite powder according to the present disclosure is suitably used for manufacturing a porous body included in an anode body of an electrolytic capacitor.

What is claimed is:

1. A composite powder for manufacturing a porous body included in an anode body of an electrolytic capacitor, the composite powder comprising:
    a raw material powder containing a valve metal; and
    an alcohol compound adhering to a surface of a particle of the raw material powder, the alcohol compound excluding a polymer,
    wherein a melting point of the alcohol compound is more than or equal to 35° C.

2. The composite powder according to claim 1, wherein the melting point of the alcohol compound is more than or equal to 35° C. and less than or equal to 120° C.

3. The composite powder according to claim 1, wherein a boiling point of the alcohol compound is less than or equal to 400° C.

4. The composite powder according to claim 1, wherein the alcohol compound contains at least one selected from the group consisting of a monohydric alcohol compound and a dihydric alcohol compound.

5. The composite powder according to claim 4, wherein the monohydric alcohol compound contains at least one selected from the group consisting of 1-tetradecanol, 1-pentadecanol, 1-hexadecanol, 1-heptadecanol, 1-octadecanol, 1-nonadecanol, 1-icosanol, 1-docosanol, 1-tetracosanol, 1-hexacosanol, 1-octacosanol, and 1-triacontanol.

6. The composite powder according to claim 4, wherein the dihydric alcohol compound contains at least one selected from the group consisting of 1,2-hexanediol, 1,6-hexanediol, 2,5-hexanediol, 2,3-dimethyl-2,3-butanediol, 2,2-diethyl-1,3-propanediol, 2-methyl-2-propyl-1,3-propanediol, 1,8-octanediol, 2,5-dimethyl-2,5-hexanediol, 2,2,4-trimethyl-1,3-pentanediol, 1,9-nonanediol, 2-butyl-2-ethyl-1,3- propanediol, 1,10-decanediol, 1,12-dodecanediol, 1,14-tetradecanediol, 1,2-hexadecanediol, and 1,16-hexadecanediol.

7. The composite powder according to claim 1, wherein a content of the alcohol compound in the composite powder is more than or equal to 0.002 parts by mass and less than or equal to 0.1 parts by mass with respect to 100 parts by mass of the raw material powder.

8. The composite powder according to claim 1, wherein a degree of solubility of the alcohol compound in at least one solvent selected from the group consisting of ethanol, isopropanol, and butyl acetate is more than or equal to 10% by mass.

9. The composite powder according to claim 1, wherein the anode body includes the porous body containing the valve metal and a dielectric layer covering a surface of the porous body.

10. A method of manufacturing a composite powder for manufacturing a porous body included in an anode body of an electrolytic capacitor, the method comprising:
    preparing a raw material powder containing a valve metal;
    preparing an alcohol solution containing a solvent and an alcohol compound having a melting point of more than or equal to 35° C., the alcohol compound excluding a polymer;
    adding the alcohol solution to the raw material powder while stirring the raw material powder to obtain the raw material powder in a wet state; and
    removing the solvent by drying the raw material powder in the wet state while stirring the raw material powder to obtain a composite powder,
    wherein the composite powder contains the raw material powder and the alcohol compound adhering to a surface of a particle of the raw material powder.

11. The method of manufacturing a composite powder according to claim 10, wherein the melting point of the alcohol compound is more than or equal to 35° C. and less than or equal to 120° C.

12. The method of manufacturing a composite powder according to claim 10, wherein a boiling point of the alcohol compound is less than or equal to 400° C.

13. The method of manufacturing a composite powder according to claim 10, wherein the alcohol compound contains at least one selected from the group consisting of a monohydric alcohol compound and a dihydric alcohol compound.

14. The method of manufacturing a composite powder according to claim 13, wherein the monohydric alcohol compound contains at least one selected from the group consisting of 1-tetradecanol, 1-pentadecanol, 1-hexadecanol, 1-heptadecanol, 1-octadecanol, 1-nonadecanol, 1-icosanol, 1-docosanol, 1-tetracosanol, 1-hexacosanol, 1-octacosanol, and 1-triacontanol.

15. The method of manufacturing a composite powder according to claim 13, wherein the dihydric alcohol compound contains at least one selected from the group consisting of 1,2-hexanediol, 1,6-hexanediol, 2,5-hexanediol, 2,3-dimethyl-2,3-butanediol, 2,2-diethyl-1,3-propanediol, 2-methyl-2-propyl-1,3-propanediol, 1,8-octanediol, 2,5-dimethyl-2,5-hexanediol, 2,2,4-trimethyl-1,3-pentanediol, 1,9-nonanediol, 2-butyl-2-ethyl-1,3-propanediol, 1,10-decanediol, 1,12-dodecanediol, 1,14-tetradecanediol, 1,2-hexadecanediol, and 1,16-hexadecanediol.

16. The method of manufacturing a composite powder according to claim 10, wherein a content of the alcohol compound in the composite powder is more than or equal to 0.002 parts by mass and less than or equal to 0.1 parts by mass with respect to 100 parts by mass of the raw material powder.

17. The method of manufacturing a composite powder according to claim 10, wherein an amount of the alcohol solution added to the raw material powder is more than or equal to 5 parts by mass and less than or equal to 20 parts by mass with respect to 100 parts by mass of the raw material powder.

18. The method of manufacturing a composite powder according to claim 10, wherein the solvent contains at least one selected from the group consisting of ethanol, isopropanol, and butyl acetate.

19. The method of manufacturing a composite powder according to claim 10, wherein the anode body includes the porous body containing the valve metal and a dielectric layer covering a surface of the porous body.

20. A method of manufacturing an anode body for an electrolytic capacitor, the method comprising:

preparing a composite powder that contains a raw material powder containing a valve metal and an alcohol compound adhering to a surface of a particle of the raw material powder, the alcohol compound excluding a polymer;

performing compression-molding after filling a predetermined mold with the composite powder to obtain a compact;

removing the alcohol compound included in the compact;

sintering the compact from which the alcohol compound has been removed to obtain a porous body; and forming a dielectric layer on a surface of the porous body to obtain an anode body, wherein a melting point of the alcohol compound is more than or equal to 35° C.

21. The method of manufacturing an anode body for an electrolytic capacitor according to claim 20, wherein the melting point of the alcohol compound is more than or equal to 35° C. and less than or equal to 120° C.

22. The method of manufacturing an anode body for an electrolytic capacitor according to claim 20, wherein a boiling point of the alcohol compound is less than or equal to 400° C.

23. The method of manufacturing an anode body for an electrolytic capacitor according to claim 20, wherein the alcohol compound contains at least one selected from the group consisting of a monohydric alcohol compound and a dihydric alcohol compound.

24. The method of manufacturing an anode body for an electrolytic capacitor according to claim 23, wherein the monohydric alcohol compound contains at least one selected from the group consisting of 1-tetradecanol, 1-pentadecanol, 1-hexadecanol, 1-heptadecanol, 1-octadecanol, 1-nonadecanol, 1-icosanol, 1-docosanol, 1-tetracosanol, 1-hexacosanol, 1-octacosanol, and 1-triacontanol.

25. The method of manufacturing an anode body for an electrolytic capacitor according to claim 23, wherein the dihydric alcohol compound contains at least one selected from the group consisting of 1,2-hexanediol, 1,6-hexanediol, 2,5-hexanediol, 2,3-dimethyl-2,3-butanediol, 2,2-diethyl-1,3-propanediol, 2-methyl-2-propyl-1,3-propanediol, 1,8-octanediol, 2,5-dimethyl-2,5-hexanediol, 2,2,4-trimethyl-1,3-pentanediol, 1,9-nonanediol, 2-butyl-2-ethyl-1,3-propanediol, 1,10-decanediol, 1,12-dodecanediol, 1,14-tetradecanediol, 1,2-hexadecanediol, and 1,16-hexadecanediol.

26. The method of manufacturing an anode body for an electrolytic capacitor according to claim 20, wherein a content of the alcohol compound in the composite powder is more than or equal to 0.002 parts by mass and less than or equal to 0.1 parts by mass with respect to 100 parts by mass of the raw material powder.

* * * * *